United States Patent [19]

LeBlanc

[11] Patent Number: 5,159,996
[45] Date of Patent: Nov. 3, 1992

[54] WRAP BAND SAFETY BRAKE

[76] Inventor: Reynold J. LeBlanc, 45312 Joe Guidry Rd., St. Amant, La. 70774

[21] Appl. No.: 611,975

[22] Filed: Nov. 13, 1990

Related U.S. Application Data

[63] Continuation-in-part of Ser. No. 548,555, Jul. 7, 1990, abandoned.

[51] Int. Cl.⁵ .................................. F16D 51/00
[52] U.S. Cl. .................................. 188/77 R; 188/105; 188/106 R
[58] Field of Search .................. 188/77 R, 74, 78, 79, 188/105, 106 R, 106 A, 106 P, 107, 140 A

[56] References Cited

U.S. PATENT DOCUMENTS

| | | | |
|---|---|---|---|
| 1,279,777 | 9/1918 | Steen | 188/77 R |
| 1,500,397 | 7/1924 | Klein | 188/77 R |
| 1,827,105 | 10/1931 | Perrot | 188/77 R |
| 3,464,528 | 9/1969 | Mork et al. | 188/77 R |
| 3,625,373 | 12/1971 | Hull | 188/105 X |
| 3,627,084 | 12/1971 | Benedek | 188/77 R |
| 4,093,184 | 6/1978 | Wieschel | 188/77 R X |

OTHER PUBLICATIONS

Dresser Industries, Inc. "Parts Book; Model 150A/150FA; Hydraulic Crane", Dec. 1985, p. 237.

Primary Examiner—Robert J. Oberleitner
Assistant Examiner—Peter M. Poon
Attorney, Agent, or Firm—David L. Ray

[57] ABSTRACT

A safety brake which can be used in conjunction with a conventional drum brake having internal brake shoes to increase the braking force provided by the drum brake. The safety brake of the invention includes an external brake shoe which extends around the outside of the brake drum and contacts the exterior surface of the brake drum. The safety brake of the invention operates on the exterior of the brake drum at the same time the internal brake shoes operate on the interior of the brake drum.

4 Claims, 2 Drawing Sheets

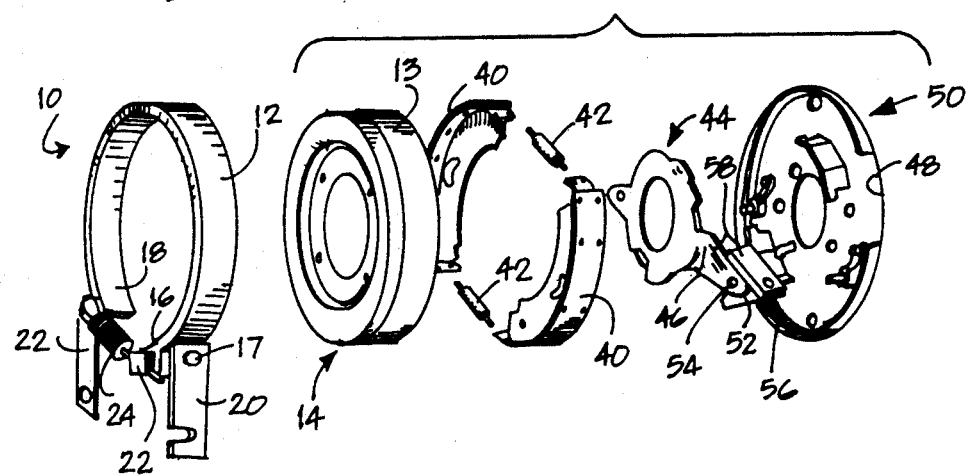
FIGURE 1 PRIOR ART
FIGURE 1A
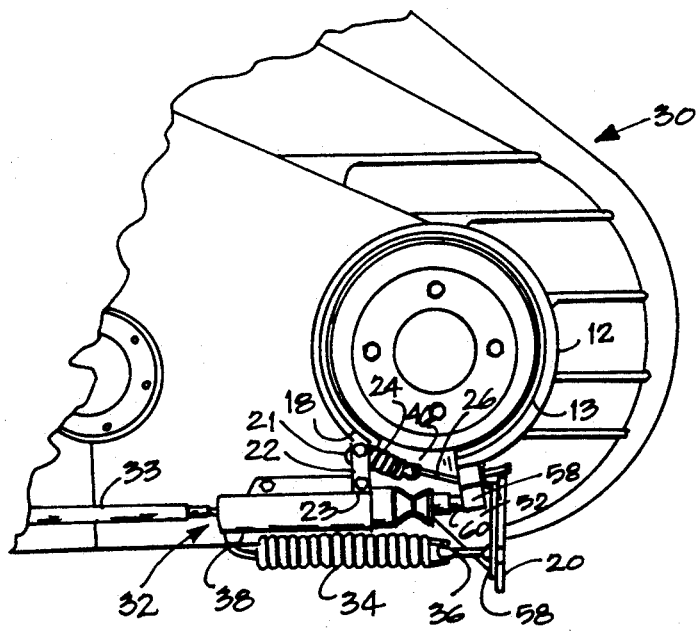
FIGURE 2

WRAP BAND SAFETY BRAKE

CROSS-REFERENCE TO RELATED APPLICATIONS

The present patent application is a continuation-in-part of presently pending U. S. patent application Ser. No. 07/548,555 filed Jul. 7, 1990 now abandoned.

BACKGROUND OF THE INVENTION

1. Field of the Invention

The present invention is related to brakes for machinery. In particular, the present invention is related to drum brakes used on crane cable spools and other hoisting equipment.

2. Description of the Related Art

Braking devices for crane cable spools and other hoisting equipment are well known in the art and are used for preventing the cable spool from unwinding after the cable is stopped in the desired position. However, when loads on the cable exceed certain minimum amounts, the conventional drum brakes on many conventional cranes begin to slip or "creep" and the cable slowly unwinds. Such unwinding or creeping is dangerous and can result in injuries to personnel and equipment. It is an object of the present to increase the braking ability of conventional drum brakes.

Exemplary of the braking devices of the prior art are the following U.S. Patents:

U.S. Pat. No. 4,518,153 discloses a safety mechanism for hoisting drums in a hoist having a motor with a motor shaft, a gear reduction unit, a drum, a safety brake drivingly coupled on an operating element on or close to the drum in which a mechanical out-of-sync detector produces a unidirectional brake-setting output from inputs from the drum and the motor shaft, the unidirectional brake-setting rotational output for setting the brake. In a preferred embodiment, an error correction is made into the detector for obtaining a first unidirectional output during normal operation, and the brake-setting unidirectional rotation is in the opposite direction for setting the brake. One form of detector is a mechanical differential assembly and another form of detector is a set of coaxial shafts that measure differential rotation between the drum and motor input shafts. A unique brake actuator is provided and is easily reset remotely after the brake has been set.

U.S. Pat. No. 4,447,044 discloses clutching and braking control for one or more hydraulically driven crane winch drums each having a hydraulically actuated clutch and a brake. Included is a negative braking mechanism having a brake cylinder of the single-acting, spring-return type for normally holding the brake applied by the force of the spring and releasing the brake on fluid pressure actuation. A mode selector valve selectively delivers hydraulic fluid under pressure from two separate sources to the clutch and the brake cylinder in order to condition the winch for a selected one of winching, brake-locking, and free-fall modes. The mode selector valve causes the negative braking mechanism to release the brake in the free-fall modes. The mode selector valve causes the negative braking mechanism to release the brake in the free-fall mode, so that a positive braking mechanism is also provided to permit the operator to arrest the free fall of the load, or the free running-out of the cable, in an exact position desired.

U.S. Pat. No. 3,994,476 discloses an automatic braking arrangement for a windlass. A hoist is described which includes a windlass for taking up and paying out a line which operates a block and tackle. The windlass is provided with a brake which is arranged to operate automatically to prevent unwanted paying out of the black and tackle line whenever a load is on the block and tackle. The brake operating mechanism includes a load sensing lever arm mounted for limited pivotal movement in response to a load being on the block and tackle, and linkage connecting such lever arm with a brake actuator for transmitting its motion to the actuator. The actuator is adapted to respond to such motion by applying the brake on the windlass to prevent its rotation in response to the force of the load.

U.S. Pat. No. 2,464,245 discloses a control for clamshell buckets including a constantly rotating element, a closing drum, a closing drum clutch to impart the rotation of the rotating element to the closing drum, a closing drum clutch lever to actuate the closing drum clutch, a holding drum, a holding drum clutch to impart the rotation of the rotating element to the closing drum, a closing drum clutch lever to actuate the closing drum clutch, a holding drum, a holding drum clutch to impart the rotation of the rotating element to the holding drum, a holding drum clutch lever to actuate the holding drum clutch, and a one-way interlock operatively connecting the closing drum clutch lever to the holding drum clutch in such manner that moving the closing drum clutch lever to set or release the closing drum clutch will respectively set or release the holding drum clutch lever free to operate the holding clutch without operating the closing clutch.

U.S. Pat. No. 2,261,382 discloses a hoist including a main frame having a plurality of transverse plates spaced with respect to each other, carriers within the main frame having tubular extensions, a drum on each tubular extension, a device for securing each drum to each tubular extension, bearings in one transverse plate for one carrier and for the tubular extension of another carrier, a bearing in another transverse plate for the tubular extension of one carrier, a bearing in still another transverse plate for such other carrier, a rotary drive shaft extending through the tubular extensions and the carriers, and driving connections for transmitting motion from the drive shaft to the carriers.

U.S. Pat. No. 1,976,406 discloses a safety brake for a hoisting drum including a brake device for braking the drum, a lever device for operating the brake device, a safety brake device automatically operated upon the release of the lever device toward normal position, and a device for cushioning the engagement of the safety brake to overcome shock in braking the drum.

U.S. Pat. No. 1,877,408 discloses a brake operating mechanism including, in combination, the operating shaft of a brake mechanism, a stationary housing, a shaft extending completely through the housing and directly rigidly connected with the operating shaft, and a device for stopping movement of the shaft transmitted to it from the operating shaft including a brake shoe for co-operating with the housing, and a toggle connection between the shaft and shoe.

U S. Pat. No. 1,811,686 discloses a direct pulling pipe spinning winch including the combination with a standard draw works of a rotary well drilling outfit having a frame, the frame having two end posts and an intermediate post, a drum, a drum shaft carrying the same and supported on the posts, a line shaft supported on the posts, and a device for driving the line shaft and the drum shaft of a rope drum carried by the line shaft, a device within the drum for operably connecting it to and disconnecting it from the line shaft, a device for operating the connecting and disconnecting device from a point adjacent one of the end posts, a brake for the drum, and a device for operating the brake from a point adjacent the other the end posts.

U.S. Pat. No. 1,488,290 discloses a material handling machine including a drive shaft, drum members rotatably mounted thereon, brake elements carried by the drive shaft and yieldably restraining the drum members from rotation thereon, a device for drivingly connecting the drum members to the drive shaft which is operable by elements movable upon the drive shaft.

U.S. Pat. No. 1,573,491 discloses a double drum hoist including a motor casing and reversible motor, a motor shaft extending from the motor, a gear box at the opposite end of the motor shaft, a central protective housing connecting the motor casing and gear box and having openings for the drum cables, a rotatable center bearing around the motor shaft forming a drum shaft, drums rotatable relatively to the drum shaft, a spiral gear on the drum shaft between the drums, an internally spiralled sleeve on the gear forming a main driver having oppositely facing teeth at its sides, toothed drum drivers on the drums adapted to cooperate alternately with the main driver according to the direction of rotation of the motor, a brake for the drum driver, and gearing operatively connecting the drum shaft to the motor shaft.

U S. Pat. No. 1,264,894 discloses an electrically operated winch, specially applicable as an ash hoist, including an electromotor, a belt pulley driven thereby, a belt, a winch drum driven by the belt from the pulley, a brake device on the winch drum, a belt tension adjusting device, an operating lever, and a rod connecting the belt tension adjusting device to the lever on one side of the fulcrum thereof.

U.S. Pat. No. 888,287 discloses a logging device which includes a pull and a return cable for engaging with the logs, a hold back cable, a device for sustaining the hold back cable at the discharging point for the logs, a winding drum for the hold back cable and a device controlled by the pulling in of the return cable for winding up the hold back cable drum.

SUMMARY OF THE INVENTION

In accordance with the present invention there is provided a safety brake which can be used in conjunction with a conventional drum brake having internal brake shoes to increase the braking force provided by the drum brake. Furthermore, in accordance with the present invention, there is provided a method for providing supplemental braking forces to a crane cable spool having a conventional drum brake, the method including forcing a wearing surface against the cylindrical interior surface of the brake drum to create a frictional braking force on the drum, and forcing a wearing surface against the cylindrical exterior surface of the brake drum to create a frictional braking force on the drum.

The safety brake of the invention includes an external brake shoe which extends around the outside of the brake drum and contacts the exterior surface of the brake drum. The safety brake of the invention operates on the exterior of the brake drum at the same time the internal brake shoes operate on the interior of the brake drum.

The present invention has the advantage of being attachable to many crane cable spool brakes presently found on many conventional cranes. The present invention can be quickly and easily added to many existing cranes to increase the braking ability of the crane cable spool brake and thereby increase the load which the crane can hold without the cable unwinding or "creeping".

BRIEF DESCRIPTION OF THE DRAWINGS

The invention will be more easily understood by reference to the drawings in which:

FIG. 1 and 1a is an exploded, perspective view of a conventional drum brake and the safety brake of the invention, FIG. 2 is a partly cut-away, elevational view of the safety brake of the invention connected to the cable spool drum brake of a crane.

DESCRIPTION OF THE PREFERRED EMBODIMENTS

Figure 3:
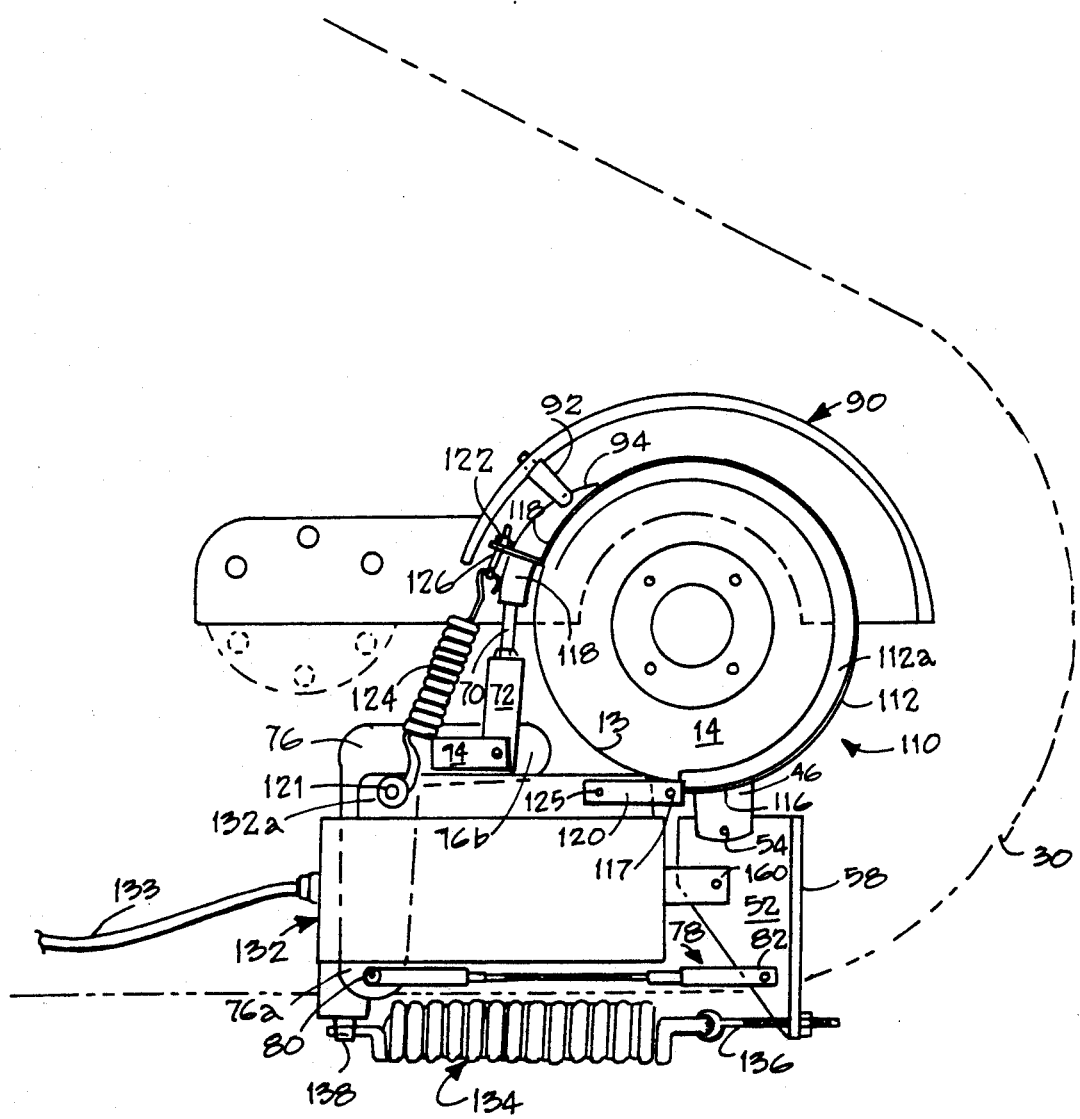
FIG. 3 is a partly cut-away, elevational view of an alternate embodiment of the safety brake of the invention connected to the cable spool drum brake of a crane.

Referring now to the drawings, the safety brake of the invention is generally indicated by the numeral 10. Safety brake 10 includes a flexible friction band 12 which is received over the outer surface 13 of conventional brake drum 14.

Friction band 12 has a first end 16 and a second end 18. Connected to the first end 16 of friction band 12 by bolt or pin 17 is rigid plate 20. Connected to the second end 18 of friction band 12 by bolt or pin 21 is rigid plate 22.

Connected to bolt 21 is spring 24 which is preferably a coil spring. Spring 24 is in turn connected to first end 16 of friction band 12 by eye bolt 26. Eye bolt 26 may be connected to block 28 by any conventional means. Block 28 is welded, bolted, or connected by any conventional means to first end 16 of friction band 12.

In FIG. 2 the safety brake 10 is shown connected to conventional brake drum 13 mounted on a conventional cable spool housing generally indicated by the numeral 30. A conventional hydraulic cylinder generally indicated by the numeral 32 and having projectable piston 60 is also attached to cable spool housing 30. Plate 22 is rigidly connected to the top side of hydraulic cylinder 32 by bolt 23.

Connected to cable spool housing 30 beneath hydraulic cylinder 32 is coil spring 34. Coil spring 34 is connected at one end to plate 20 by eye bolt 36 and at the other end to cable spool housing 30 by bolt 38.

In FIG. 1, conventional brake drum 14 can be seen to have conventional brake shoes 40-40 therein connected by springs 42—42. A conventional lever mechanism generally indicated by the numeral 44 is utilized to force brake shoes 42—42 into contact with the inner surface of brake drum 14 when the lever mechanism is rotated.

Lever mechanism 44 has a lever arm 46 which extends through the slot 48 in the brake drum cover generally indicated by the numeral 50. Plate 52 is pinned to lever arm 46 by pin 54. Plate 52 has a perpendicular section 58 having hole 56 therein for receipt of eye bolt 36.

To apply the brakes, both internal and external, the pressure of the hydraulic fluid supplied to cylinder 32 through hydraulic supply line 33 is reduced until hydraulic piston 60 is fully retracted into hydraulic cylinder 32 by springs 24 and 34. Springs 24 and 34 turn lever arm 46 to force brake shoes 40—40 against the interior surface of brake drum 14, and, simultaneously draw first end 16 of friction band 12 toward second end 18 of friction band 12, tightening friction band 12 around the exterior surface 13 of brake drum 14.

It can be seen from the above that the safety brake of the invention can be easily attached to the exterior of a conventional drum brake projecting from the side of a conventional crane cable spool, and to the hydraulic actuating mechanism of the drum brake. By contacting the exterior surface of the brake drum, the safety brake of the invention can greatly increase the braking ability or braking torque generated by a conventional drum brake.

Referring now to FIG. 3 of the drawings, an alternate embodiment of the safety brake of the invention is generally indicated by the numeral 110. Safety brake 110 includes preferably a flexible metal friction band 112 having a wearing surface 112l bonded thereto which is received over the outer surface 13 of conventional brake drum 14.

Friction band 112 has a first end 116 and a second end 118. Connected to the first end 116 of friction band 112 by bolt or pin 117 is rigid plate 120. Preferably, rigid plate 120 is rotatably connected to the first end 116 by bolt or pin 117.

Connected to the second end 118 of friction band 112 is rigid plate 122. Rigid plate 122 is welded, bolted, or connected by any conventional means to second end 118 of friction band 112.

Connected to rigid plate 122 by eye bolt 126 is spring 124 which is preferably a coil spring. Spring 124 is in turn preferably connected to pivot pin 121, although spring 124 could be connected to any other suitable stationary point on cable spool housing 30 or hydraulic cylinder 132 or cylinder attachment plate 132a if desired. Pivot pin 121 preferably is rigidly connected to cable spool housing 30. Eye bolt 126 may be connected to rigid plate 122 by any conventional means.

Also connected to the second end 118 of friction ring band 112 is socket member 118a for receipt of bolt 70. Bolt 70 is threaded into bolt holder 72. Bolt holder 72 is connected to bolt holder receiver 74 which is rigidly connected to pivot member 76.

Pivot member 76 is a rigid, flat plate having two legs 76a and 76b which are connected together at an approximate right angle. Pivot member 76 pivots or rotates about pivot pin 121.

An adjustable rod generally indicated by the numeral 78 is pivotally connected to leg 76a of pivot member 76 by pin 80. Adjustable rod 78 is pivotally connected to plate 52 by pin 82.

In FIG. 3 the safety brake 110 is shown connected to the conventional brake drum 13 mounted on a conventional cable spool housing generally indicated by the numeral 30. A conventional hydraulic cylinder generally indicated by the numeral 132 and having projectable piston 160 is also attached to cable spool housing 30 by cylinder attachment plate 132a which is rigidly attached to hydraulic cylinder 132 and cable spool housing 30. Plate 120 is rigidly connected to the top side of hydraulic cylinder 132 by bolt 123.

Connected to cable spool housing 30 beneath hydraulic cylinder 132 is coil spring 134. Coil spring 134 is connected at one end to plate 58 by eye bolt 136 and at the other end to cable spool housing 30 by pin 138.

The conventional internal brake inside the brake drum 14 on which safety brake 110 is used is shown in FIG. 1. Brake drum 14 can be seen to have conventional brake shoes 40—40 therein connected by springs 42—42. A conventional lever mechanism generally indicated by the numeral 44 is utilized to force brake shoes 40—40 into contact with the inner surface of brake drum 14 when the lever mechanism 44 is rotated.

Lever mechanism 44 has a lever arm 46 which extends through the slot 48 in the brake drum cover generally indicated by the numeral 50. Plate 52 is pinned to lever arm 46 by pin 54. Plate 52 has a perpendicular section 58 having hole 56 therein for receipt of eye bolt 136.

To apply the brakes, both internal and external, the pressure of the hydraulic fluid supplied to cylinder 132 through hydraulic supply line 133 is reduced until hydraulic piston 160 is fully retracted into hydraulic cylinder 132 by spring 134. Springs 124 and 134 turn lever arm 46 to force brake shoes 40—40 against the interior surface of brake drum 14, and, simultaneously draw second end 118 of friction band 112 downward toward attachment plate 132a, thereby tightening friction band 112 and wearing surface 112a tightly around the exterior surface 13 of brake drum 14.

If desired, a guard generally indicated by the numeral 90 may be added to safety brake 110. Guard 90 may be used to surround friction band 112, and an outer cover (not shown) can be attached to guard 90 if desired. If desired, a guide 92 having a slot therein (not shown) for receipt of ridge 94 connected to friction band 112 could be rigidly connected to guard 90 to locate friction band 112 at a desired position on the surface 13 of brake drum 14.

It can be seen from the above that the safety brake of the invention can be easily attached to the exterior of a conventional drum brake projecting from the side of a conventional crane cable spool, and to the hydraulic actuating mechanism of the drum brake. By contacting the exterior surface of the brake drum, the safety brake of the invention can greatly increase the braking ability or braking torque generated by a conventional drum brake.

Although the preferred embodiments of the present invention have been disclosed and described in detail above, it should be understood that the invention is in no sense limited thereby, and its scope is to be determined by that of the following claim.

What is claimed is:

1. A supplementary braking system for a drum brake connected to a crane cable spool having a cylindrical brake drum with a cylindrical interior braking surface and a cylindrical exterior surface, internal brake shoes, and a mechanically operated lever arm for forcing the brake shoes into contact with the interior braking surface of the brake drum, the mechanically operated lever arm being operated by a hydraulic cylinder and piston assembly connected to the crane cable spool and located adjacent to the brake drum, the piston being forced to retract into the cylinder by a first spring connected to the lever arm and to the cable spool, comprising:

a. friction band means wrapped around the exterior of the cylindrical brake drum for contacting the cylindrical exterior surface of the brake drum, said friction band means having a first end and a second end, said friction band means being shorter in length than the circumference of the exterior surface of said brake drum,
b. first fastening means connected to said first end of said friction band means for fastening said first end of said friction band means adjacent to said brake drum,
c. a rigid pivot member constructed from a rigid, flat plate having a first leg and a second leg connected at an approximate right angle,
said pivot member being pivotally connected at the intersection of said first leg and said second leg of said pivot member to a fixed pivot pin,
said first leg of said pivot member being pivotally connected to said second end of said friction band means for biasing said second end of said friction band means
  i. away from the cylindrical exterior surface of said brake drum as the piston is extended, and
  ii. toward the exterior cylindrical surface of said brake drum as the piston is retracted, said second leg of said pivot member means being pivotally connected to the lever arm operated by the hydraulic cylinder and piston by rigid rod means, and
d. a second spring having a first end and a second end, said first end of said second spring being connected to said second end of said friction band means of biasing said friction band means against the cylindrical exterior surface of said brake drum, and said second end of said second spring being connected t said pin means.

2. The braking system of claim 1 wherein said first fastening means is connected to said hydraulic cylinder and piston assembly.

3. The braking system of claim 1 wherein said friction band means is flexible.

4. The supplementary braking system of claim 1 wherein said rigid rod means comprises adjustment means.

* * * * *